United States Patent
Watanabe et al.

[11] Patent Number: 6,157,526
[45] Date of Patent: *Dec. 5, 2000

[54] MAGNETORESISTIVE HEAD AND MAGNETIC DISK APPARATUS

[75] Inventors: Katsuro Watanabe, Hitachi; Takashi Kawabe, Odawara; Shigeru Tadokoro, Odawara; Hiroshi Kamio, Odawara; Takao Imagawa, Mito, all of Japan

[73] Assignee: Hitachi, Ltd., Tokyo, Japan

[*] Notice: This patent is subject to a terminal disclaimer.

[21] Appl. No.: 09/450,763

[22] Filed: Nov. 30, 1999

Related U.S. Application Data

[63] Continuation of application No. 08/733,713, Oct. 23, 1996, Pat. No. 5,995,338, which is a continuation of application No. 08/683,978, Jul. 22, 1996.

[30]    Foreign Application Priority Data

Jul. 25, 1995  [JP]  Japan .................................... 7-188812
May 31, 1996  [JP]  Japan .................................... 8-137963

[51] Int. Cl.[7] ...................................................... G11B 5/39
[52] U.S. Cl. ....................................................... 360/324.12
[58] Field of Search .............................. 360/113, 327.11, 360/327.3, 327.32, 327.31, 324.1, 324.11, 324.12; 428/692; 324/252; 338/32 R; 365/158

[56]    References Cited

U.S. PATENT DOCUMENTS

| 4,639,806 | 1/1987 | Kira et al. ................................ 360/113 |
| 4,782,413 | 11/1988 | Howard et al. .......................... 360/113 |
| 4,916,563 | 4/1990 | Kawase ..................................... 360/119 |
| 5,159,513 | 10/1992 | Dieny et al. ............................. 360/113 |
| 5,285,339 | 2/1994 | Chen et al. ............................... 360/113 |
| 5,315,468 | 5/1994 | Lin et al. .................................. 360/113 |
| 5,325,253 | 6/1994 | Chen et al. ............................... 360/113 |
| 5,434,826 | 7/1995 | Ravipati et al. ......................... 360/113 |
| 5,436,777 | 7/1995 | Soeya et al. .............................. 360/113 |
| 5,549,978 | 8/1996 | Iwasaki et al. .......................... 360/113 |
| 5,664,316 | 9/1997 | Chen et al. ........................... 29/603.08 |
| 5,668,523 | 9/1997 | Chen et al. ............................... 360/113 |
| 5,995,338 | 11/1999 | Watanabe et al. ....................... 360/113 |

*Primary Examiner*—David L. Ometz
*Attorney, Agent, or Firm*—Antonelli, Terry, Stout & Kraus, LLP

[57]    ABSTRACT

A magnetoresistive head in which Barkhausen noise is substantially suppressed and a variation in reproduction is minimized, and a magnetic disk apparatus using the same magnetic head have been provided. The feature of the magnetic head and the magnetic disk apparatus of the invention resides in the provision of a longitudinal bias layer which comprises a hard magnetic thin film formed on an underlayer made of either a ferromagnetic thin film having a body-centered cubic lattice crystal structure, or an amorphous ferromagnetic thin film or antiferromagnetic thin film having a body-centered cubic lattice crystal structure.

7 Claims, 11 Drawing Sheets

MAGNETORESISTIVE HEAD AND MAGNETIC DISK APPARATUS

CROSS-REFERENCE TO RELATED APPLICATIONS

This application is a continuation of application Ser. No. 08/733,713 filed on Oct. 23, 1996, now U.S. Pat. No. 5,995,338, which is a continuation of application Ser. No. 08/683,978 filed on Jul. 22, 1996, the entire disclosures of which are hereby incorporated by reference.

BACKGROUND OF THE INVENTION

The present invention relates to a magnetic disk apparatus, and in particular, to a magnetoresistive head for use in reproducing magnetically recorded information.

With the introduction of a more compact and high-density magnetic disk apparatus, a magnetoresistive head (MR head) which is capable of producing a high reproducing output voltage independent of the relative speed between the disk and the head has been put to actual use. An MR head presently in use on a magnetic disk apparatus utilizes an anisotropic magnetoresistive effect in which the electric resistance of the head changes depending on the relative angle between the direction of magnetization in a magnetic film and the direction of the signal detection current flow. Efforts to enhance its performance are being made through improvements in head structure and use of thin film materials. When a high aereal recording density as high as several $Gb/in^2$ is required, any MR head which utilizes the anisotropic magnetoresistive effect will not be able to achieve enough sensitivity; therefore, development of a new head utilizing a giant magnetoresistive effect is under way in which the electrical resistance of the head changes in response to the relative angle between respective directions of magnetization in two magnetic thin films which are laminated with a non-magnetic conductive thin film interposed therebetween. In any of the MR heads mentioned above, changes of electrical resistance take place due to rotation of magnetization in the magnetoresistance film; therefore, in order to obtain a noise-free reproducing waveform, movement of domain walls must be suppressed as much as possible.

As a means for suppressing Barkhausen noise due to movement of the domain walls, a laminated structure is disclosed in U.S. Pat. No. 5,005,096 in which a hard magnetic thin film is laminated on a magnetoresistance film via a non-magnetic thin film, and other structures are disclosed in U.S. Pat. Nos. 5,018,037 and 5,079,035 in which hard magnetic thin films are disposed in abutting relationship with the magneto-resistance film on both sides thereof.

For any hard magnetic thin film to be used in a magnetoresistive head, two fundamental magnetic properties are required in order to prevent Barkhausen noise. One requirement is that the head must have a large coercive force. Namely, since the MR head has applied thereto a signal field from a recorded medium and also is subjected to a recording field, in order to ensure that a stable reproducing characteristic will be maintained even when such external magnetic fields are applied, a coercive force of a sufficient magnitude is required so that a longitudinal bias magnetic field impressed from the hard magnetic thin film to the magnetoresistance film will not change easily. The other requirement is that an in-plane component of magnetization should be large enough, that is, the squareness of a hysteresis loop along an intraplane direction should be large. Since it is this component among the magnetization components of the hard magnetic thin film that plays a major role to act effectively as the longitudinal bias field, it is necessary for this in-plane component to be substantially large, as well as for the squareness of its hysteresis loop to be substantially large, so that the longitudinal bias field will remain invariant even if external magnetic fields are applied.

FIG. 15 is a schematic diagram indicative of the structure of a prior art MR head disclosed in U.S. Pat. No. 5,005,096. This prior art MR head is directed to suppressing Barkhausen noise in magnetoresistive film 15 by impressing thereon a magnetic field produced by hard magnetic thin film 26, which is formed on non-magnetic underlayer 251 made of Cr or the like. Although it is possible to obtain a hard magnetic thin film 26 which has a large coercive force and a large squareness through the provision of non-magnetic underlayer 251, since a portion of the magnetic field derived from hard magnetic thin film 26 is caused to recirculate through an MR element, including soft magnetic thin film 13, spacer film 14 and magnetoresistive film 15, the directions of magnetization in the magnetoresistive film 15 become opposite between the sensing region and both sides thereof, as indicated in FIG. 15. Therefore, the state of magnetization in the magnetoresistive film 15 becomes very unstable, with the result that it becomes difficult to suppress Barkhausen noise.

FIG. 16 depicts the structure of an MR element disclosed in U.S. Pat. Nos. 5,018,037 and 5,079,035, in which, on both sides of the MR element, a hard magnetic thin film is formed in order to eliminate a region having a magnetization component whose direction is reversed within the magnetoresistive film, and thereby ensure that the magnetic field generated from the hard magnetic thin film is caused to act only in a single direction. This structure of laminated films, including soft magnetic thin film 13, spacer film 14 and magnetoresistive film 15 (hereinafter referred to as soft magnetic thin film/spacer film/magnetoresistive film) is formed by the steps of etching other regions except for the sensing region, forming hard magnetic thin films 26 on the both sides of the sensing region, forming electrodes on the hard magnetic thin films 26.

Then, it is necessary to etch the sides of the lamination of the soft magnetic thin film/spacer film/magnetoresistive film to form a taper so as to obtain a magnetic coupling and electrical contact between the soft magnetic thin film/spacer film/magnetoresistive film and the hard magnetic thin film 26 as well as the electrode, whereby, a portion of hard magnetic thin film 26 is formed on the taper of the soft magnetic thin film/spacer film/magnetoresistive film. However, there is a problem associated with this prior art technique in that, since the soft magnetic thin film 13 or magnetoresistive film 15 normally has a crystal structure of a face-centered cubic lattice, a portion of the hard magnetic thin film which is formed on such a crystal structure tends to have its property deteriorate greatly, in particular, its coercive force, compared to that in other portions thereof.

Further, there is another problem associated with the prior art which generally uses a Co—Cr—Pt hard magnetic thin film or Co—Cr hard magnetic thin film as the hard magnetic thin film 26 in that it is difficult to obtain a sufficiently large in-plane component of magnetization or squareness on other areas excepting areas of the soft magnetic thin film 13 or magnetoresistive film 15. Growth of thin films generally has a tendency that the most dense crystal plane becomes parallel to the film surface, whereby, in the case of the hard magnetic thin film of the prior art, the <001> plane is likely to be oriented parallel to the film surface. On the other hand, since the direction of easy magnetization is in the direction of <001>, magnetization tends to be directed perpendicular to the film plane, which causes the in-plane component that generates the longitudinal bias field most effectively to decrease.

These problems associated with the prior art can be solved by providing an appropriate underlayer and by forming a hard magnetic thin film thereon. According to current studies on magnetic recording medium, the provision of non-magnetic underlayers made of Cr or the like is known to be effective. However, the non-magnetic underlayer provided under the hard magnetic thin film for use in the MR head will interrupt a mutual magnetic coupling between hard magnetic thin film 26 and soft magnetic thin film 13 as well as magnetoresistive film 15, whereby, a desired effect to stabilize magnetization in both side regions of the soft magnetic thin film 13 and magnetoresistive film 15 cannot be attained. Thereby, magnetization in these ferromagnetic thin films become unstable, causing a Barkhausen noise and a fluctuation in reproducing characteristics to occur readily.

While the problems associated with the prior art MR head using the anisotropic magnetoresistive effect have been described hereinabove, it should be understood that the same problems will take place with an MR head which uses a macro magnetoresistive effect, since its MR element is composed of a ferromagnetic thin film having a crystal structure of a face-centered cubic lattice.

SUMMARY OF THE INVENTION

An object of the present invention is to provide a magnetoresistive head, and a magnetic disk apparatus using the same, which head has an improved coercive force and improved squareness of the characteristic for its hard magnetic thin film, thereby preventing the coercive force of the hard magnetic thin film from decreasing even if disposed on a ferromagnetic thin film having a crystal structure of face-centered cubic lattice, and which is free from Barkhausen noise, and has a stable reproducing property, which has been realized by obtaining a mutual magnetic coupling between the hard magnetic thin film and a ferromagnetic thin film constituting the MR element.

The above-mentioned object of the invention can be accomplished by providing a magnetoresistive head having a magnetoresistive film which transduces a magnetic signal to an electric signal by means of a magnetoresistive effect, a pair of electrodes for supplying a signal detection current to the magnetoresistive film, and a longitudinal bias layer for applying a longitudinal bias field to the magnetoresistive film, wherein said longitudinal bias layer comprises a underlayer made of a ferromagnetic thin film and a hard magnetic thin film formed thereon.

By way of example, any ferromagnetic thin film having a crystal structure of a body-centered cubic lattice or an amorphous ferromagnetic thin film can be utilized as the underlayer comprised of the ferromagnetic thin film. Further, the above-mentioned object of the invention can be attained also by use of an underlayer comprising an antiferromagnetic thin film, instead of an underlayer comprising a ferromagnetic thin film.

In the case where the magnetoresistive film uses a material which exhibits an anisotropic magnetoresistive effect, it is necessary to provide means for applying a transverse bias field to the magnetoresistive film. A typical method of applying such a bias is implemented through a soft magnetic thin film which is provided in abutting relationship to the magnetoresistive film via a spacer film.

Further, the magnetoresistive film of the invention may include a multi-layered film comprising a first magnetic thin film, a second magnetic thin film and a non-magnetic conductive thin film which is interposed therebetween, wherein the direction of magnetization of said first magnetic thin film is fixed by an antiferromagnetic layer which is provided in abutting relationship with the first magnetic thin film, and the direction of magnetization of said second magnetic thin film is substantially perpendicular to the direction of magnetization of said first magnetic thin film with the presence of no external magnetic field, and wherein the electrical resistance of the multi-layered magnetoresistive film changes according to the relative angle between the direction of magnetization in said first magnetic thin film and the direction of magnetization in said second magnetic thin film. Materials which may be used as the hard magnetic thin film of the invention includes an alloy having Co and $M_1$ as main components (where $M_1$ is at least one element selected from the group of Cr, Ta, Ni, Pt and Re), or an alloy with an addition of an oxide having an alloy made of Co and $M_1$ and the addition of $M_2$ (where $M_2$ is at least one oxide selected from the group consisting of silicon oxide, zirconium oxide, aluminum oxide and tantalum oxide). Typical examples include Co—Cr—Pt alloy, Co—Re alloy, Co—Cr—alloy, Co—Ta—Cr alloy, Co—Ni—Pt alloy, (Co—Cr—Pt)—$SiO_2$ alloy, (Co—Cr—Pt)—$ZrO_2$ alloy and the like.

Material used as an underlayer of the hard magnetic thin film, which is a ferromagnetic thin film having a crystal structure of a body-centered cubic lattice, includes Fe—Cr alloy, Fe, Fe—Ni alloy, Fe—Co alloy, Fe—Ni—Co alloy, or any alloy having one of the above-mentioned alloys with the addition of $M_3$ (where $M_3$ is at least one element selected from the group consisting of Si, V, Cr, Nb, Mo, Ta and W).

In the case of Fe—Ni alloy, Fe-O to 25 at. % Ni is used. In the case of Fe—Co alloy, Fe-O to 80 at. % Co is used. In the case of Fe—Ni—Co alloy, $Fe_{100ab}$—$Nu_a$—$Co_b$ (where $0 \leq a \leq 25$, $0 \leq b \leq 80$) is used. In the case where Fe and an alloy of Fe with the addition of any of the above-mentioned non-magnetic elements is used, the material should be used as a ferromagnetic underlayer in a range of component ratios that will ensure a stable body-centered cubic lattice structure and exhibit a ferromagnetism at temperatures about 100° C. at which a magnetoresistive head operates in the magnetic disk apparatus. In the case of a combination of Fe and any of the above-mentioned additive elements, respective upper limits of addition of respective elements are 32 at. % for Si, 48 at. % for V and 45 at. % for Cr, and 6 at. % for Nb, Mo, Ta and w, respectively. Among these, in particular, Fe—Cr alloy is preferable in which 5 to 45 at. % of Cr is preferred to obtain a high corrosion resistance.

As a material to be used as the underlayer comprised of an amorphous ferromagnetic thin film, an amorphous alloy having as its main components Co and $M_4$ is utilized (where $M_4$ is at least one element selected from the group consisting of Ti, V, Cr, Zr, Nb, Mo, Hf. Ta, Y, Ru, Rh, Cu, Ag, Au and Pt).

Further, as a material of the antiferromagnetic thin film having a crystal structure of a body-centered cubic lattice, an alloy having as its main components Cr, Mn and $M_5$ is utilized (where $M_5$ is at least one element selected from the group consisting of Cu, Au, Ag, Co, Ni and platinum metal).

Through use of the underlayer made of either a ferromagnetic thin film having a crystal structure of a body-centered cubic lattice, an amorphous ferromagnetic thin film or an antiferromagnetic thin film having a crystal structure of a body-centered cubic lattice, the following result can be produced advantageously according to the invention.

The coercive force and squareness of the hysteresis loop can be significantly improved since the direction <001> of the hard magnetic thin film which corresponds to the direction of easy magnetization is inclined from a direction perpendicular to the film plane toward a direction parallel to the film plane, or is completely oriented in the direction of the film plane.

Further, when forming a hard magnetic thin film on a ferromagnetic thin film having a crystal structure of a body-centered cubic lattice, such as a magnetoresistive film, soft magnetic thin film and a multi-layered magnetoresistive film, growth of any crystal grains having a face-centered cubic lattice with a small magneto crystalline anisotropy is suppressed within the hard magnetic thin film, thereby preventing a decrease of coercive force. As for the materials of the aforementioned hard magnetic thin film, there is a face-centered cubic lattice having a small magnetocrystalline anisotropy other than crystals which have a hexagonal close-packed lattice with a large magnetocrystalline anisotropy. When the layer on which the hard magnetic thin film is to be formed has a face-centered cubic lattice, crystal grains having a face-centered cubic lattice tend to be formed also in the hard magnetic thin film since its crystal structure is influenced. However, by use of the underlayer described above, a decrease of coercive force can be prevented.

A hard magnetic thin film, even if it is formed on a layer having a different crystal structure, can produce a hard magnetic thin film having a uniform magnetic characteristic independent of a difference of bottom layers through the provision of the above-mentioned underlayer.

Further, through interaction due to a mutual magnetic coupling between the hard magnetic thin film and the ferromagnetic thin films which constitute the MR element, the direction of magnetization within the ferromagnetic thin film constituting the MR element can be oriented stably in the same direction as that of a longitudinal bias field which is produced from the hard magnetic thin film and which enters a sensing region of the MR element.

The ferromagnetic thin film having a crystal structure of a body-centered cubic lattice which is used as the underlayer according to this invention has a significant role in changing the crystal orientation in a hard magnetic thin film to be formed thereon and to increase the in-plane magnetization components. An alloy having Fe and Cr as its main components for use as the ferromagnetic thin film of the invention is adapted to have a stable body-centered cubic structure, and is formed into a ferromagnetic thin film having a body-centered cubic lattice by a known manufacturing method. Further, Fe—Cr alloy having a composition of Cr from 5 to 45 atomic % provides a preferred underlayer according to the invention since it has an excellent corrosion resistance suitable for practical application as well as exhibiting an excellent ferromagnetism at temperatures of about 100° C., which is the ambient temperature during the operation of the magnetic disk apparatus.

When a hard magnetic thin film is used as a longitudinal bias layer of the magnetoresistive head, the intrinsic coercive force of the hard magnetic thin film must have a sufficiently large value compared to that of the external magnetic field acting thereon. However, when a hard magnetic thin film is formed on the magnetoresistive film or on a Ni—Fe—X ternary alloy thin film which is used as a soft magnetic thin film provided for applying a transverse bias field, its intrinsic coercive force decreases significantly compared to when it is formed on a glass substrate, and so it cannot be used as the longitudinal bias layer. In order to prevent the intrinsic coercive force from decreasing, a method is adopted of laminating a hard magnetic thin film on a magnetoresistive film or a soft magnetic thin film via a non-magnetic layer. In this case, however, Barkhausen noise cannot be suppressed sufficiently. This is because there exists a portion in the magnetoresistive film or in the soft magnetic thin film which has a magnetization in a direction which is opposite to the direction of magnetization of the hard magnetic thin film, thereby causing instability in the direction of magnetization or causing a magnetic domain wall. Thereby, if the direction of magnetization in the magnetoresistive film or the soft magnetic thin film is stabilized in the same direction as that of the magnetization of the hard magnetic thin film, Barkhausen noise can be significantly suppressed.

In order to suppress a decrease in the intrinsic coercive force of the hard magnetic thin film and to stabilize the direction of magnetization in the magnetoresistive film or the soft magnetic thin film in the same direction as that of magnetization of the hard magnetic thin film, it is most effective to form a ferromagnetic thin film having a crystal structure of a body-centered cubic lattice as an underlayer, and then to form a hard magnetic thin film thereon. This step of providing a film having a crystal structure of a body-centered cubic lattice as the underlayer according to the invention is directed to suppressing the growth of crystal grains having a body-centered cubic lattice, the magnetocrystalline anisotropy of which is substantially small, and to promoting the growth of a hexagonal close-packed lattice, the magnetocrystalline anisotropy of which is substantially large. Further, the provision of an underlayer which uses a ferromagnetic material produces a magnetic exchange coupling between the magnetoresistive film or the soft magnetic thin film and the hard magnetic thin film, so that the direction of magnetization is stabilized in the same direction. Through provision of such an arrangement according to the invention, a combination of the effect by the longitudinal bias field due to the hard magnetic thin film and the effect of stabilization of the magnetization due to the magnetic exchange coupling produces an improved suppression effect to reduce Barkhausen noise. Conversely, due to the additional effect of the mutual magnetic coupling which promotes stabilization of the magnetization, the same noise suppression effect can be attained using a hard magnetic thin film which has a smaller intrinsic coercive force, thereby broadening the scope of options available for the materials of the hard magnetic thin film and the conditions for film deposition, thereby facilitating the manufacturing thereof.

The same effect and advantage can be obtained to suppress Barkhausen noise through use of an antiferromagnetic thin film having a crystal structure of a body-centered cubic lattice or an amorphous ferromagnetic thin film for the underlayer.

The magnitude of a longitudinal magnetic field, since it depends on the amount of magnetic flux from the ferromagnetic film which constitutes the longitudinal bias layer, is adjusted in general by changing the residual magnetic flux density and film thickness of the ferromagnetic film. As for the hard magnetic thin film having an underlayer, an actual effect is determined by the sum of the product between the residual flux density of the hard magnetic thin film and the thickness thereof, and the product between the residual flux density of the underlayer and the thickness thereof. In regard to controllability of the longitudinal bias field, it is most easy to control the same when an antiferromagnetic thin film is used, since the magnetic flux from the underlayer will be eliminated. When the underlayer used is a ferromagnetic thin film, irrespective of whether its crystal structure is of a body-centered cubic lattice or is amorphous, it is considered that the smaller the residual flux density, the easier it will be to control the longitudinal bias field by taking into account a variation of the film thickness.

Preferably, the aforementioned hard magnetic thin film is either a Co—Pt alloy, Co—Cr—Pt alloy, Co—Re alloy, Co—Cr alloy, Co—Ta—Cr alloy, Co—Ni—Pt alloy, or its alloy with addition of at least one oxide selected from the group consisting of zirconium oxide, tantalum oxide, aluminum oxide and silicon oxide.

The Co—Cr—Pt alloy or its alloy with addition of oxides described above as an example of the hard magnetic thin film of the invention preferably comprises compositions of eq. 1 or eq. 2 as described below.

$$Co_a Cr_b Pt_c \qquad (\text{eq. 1})$$

or

$$(Co_a Cr_b Pt_c)_{1-x}(MO_y)_x \qquad (\text{eq. 2})$$

where, x:0.01 to 0.20, y:0.4 to 3, a:0.5 to 0.9, b: 0 to 0.25, c:0.03 to 0.30, M:at least one of Zr, Ta, Al and Si.

In the case where the magnetoresistive film uses a material which exhibits an anisotropic magnetoresistive effect, it is necessary to provide means for applying a transverse bias field to the magnetoresistive film. One of the transverse biasing methods is implemented through a soft magnetic thin film which is provided in abutting relationship with the magnetoresistive film via a spacer film.

The soft magnetic thin film for applying the transverse bias field to the magnetoresistive film is preferably a compound made of one of a Ni—Fe alloy, Co, Ni—Fe—Co alloy, and at least one or more compounds selected from the group consisting of zirconium oxide, aluminum oxide, hafnium oxide, titanium oxide, beryllium oxide, magnesium oxide, tantalum oxide, rare earth oxide compound, zirconium nitride, hafnium nitride, aluminum nitride, titanium nitride, beryllium nitride, magnesium nitride, silicon nitride and rare earth nitride compound.

As to a quantity of each compound to be contained in said soft magnetic thin film for use in the magnetoresistive head according to the invention, each atomic percentage except for oxygen or nitrogen in each compound is preferably from 3 to 20% relative to a total atomic percentage, except for oxygen and nitrogen. This is because, when a quantity of a compound is less than 3%, its electrical resistance is small, and when it is more than 20%, its saturated magnetic flux density decreases so much as to be insufficient for a transverse bias film. The resistivity of a soft magnetic thin film according to the invention increases substantially proportion to the quantity of added compounds; however, it is preferable for a magnetoresistive head to have a resistivity of 70 $\mu\Omega$ cm or more. This is due to an observation that the output of the magnetoresistive head will decrease unless the resistivity of the bias film is sufficiently greater than the resistivity of the magnetoresistive film. Since the resistivity of the magnetoresistive film is normally from 20 to 30 $\mu\Omega$ cm, at least twice that value is preferred as a guideline for the resistivity of the soft magnetic thin film.

In the case where a multi-layered magnetoresistive film which is exhibits a giant magnetoresistive effect is utilized, an example of the magnetoresistive head of the invention will have a pair of longitudinal bias layers, a pair of electrodes formed thereon, and the multi-layered magnetoresistive film provided between said pair of longitudinal bias layers abutting thereto, wherein said multi-layered magnetoresistive film comprises an antiferromagnetic film made of nickel oxide, two layers of ferromagnetic films, a non-magnetic metal film and a soft magnetic film, which are deposited on the substrate sequentially, and wherein the longitudinal bias layer comprises the aforementioned arrangement.

Preferably, the two layers of ferromagnetic films comprise a ferro-alloy layer containing Ni from 70 to 95 atomic percentage and a Co layer or a Co alloy layer, which are deposited sequentially on the substrate. The two layers of ferromagnetic films preferably comprise a first soft magnetic film which is adjacent to the antiferromagnetic film and a second soft magnetic film which has a larger spin dependent scattering than that of the first soft magnetic film.

Another example of a magnetoresistive head of the invention with a multi-layered magnetoresistive film has a pair of longitudinal bias layers, a pair of electrodes formed on the pair of said longitudinal bias layers, and a multi-layered magnetoresistive film provided between said pair of longitudinal bias layers abutting thereto, wherein said multi-layered magnetoresistive film comprises an antiferromagnetic film, a first ferromagnetic film, a first non-magnetic film, a soft magnetic film, a second non-magnetic film, a second ferromagnetic film and an antiferromagnetic film, each film being deposited sequentially from the side of a substrate.

As the aforementioned soft magnetic film, it is preferable to use an alloy including Ni from 70 to 95 atomic percentage and Fe from 5 to 30 atomic percentage, or an alloy of the foregoing with addition of Co from 1 to 5 atomic percentage, or an alloy including Co from 30 to 85 atomic percentage, Ni from 2 to 30 atomic percentage and Fe from 2 to 50 atomic percentage, all of which have a face-centered cubic lattice structure. In addition, other alloys such as Permalloy, Perminvar or the like may be used likewise. Namely, it is preferable to use a material which is ferromagnetic and has a good soft magnetic characteristic since such material will facilitate manufacturing of a desirable lamination structure, and provide an improved soft magnetism characteristic and an improved magnetoresistive effect.

As the aforementioned non-magnetic conductive film, it is preferable to use Au, Ag, Cu; otherwise, Cr, Pt, Pd, Ru, Rh etc., or their alloy may be used. That is, it is desirable to use a material that does not have a spontaneous magnetization at room temperatures, and has a good electron transmissivity.

Through the provision of such a film structure, the magnetoresistive element of the invention is provided with a property such that its electrical resistance is allowed to change significantly in a range from 5 to 10% when subjected to a weak external magnetic field.

BRIEF DESCRIPTION OF THE DRAWINGS

Other features and advantages of the invention will be apparent from the following description when taken in connection with the accompanying drawings, wherein.

DESCRIPTION OF THE EMBODIMENTS

In the description of the various embodiments, reference will be made to the drawings wherein elements of the embodiments are identified as follows:

10 . . . non-magnetic substrate, 13 . . . soft magnetic thin film, 14 . . . spacer film, 33, 43, 56 . . . non-magnetic conductive thin films, 15 . . . magnetoresistive film, 17 . . . electrode, 18, 20 . . . insulating films, 21 . . . second ferromagnetic film, 22 . . . soft magnetic film, 24 . . . longitudinal bias layer, 26 . . . hard magnetic thin film, 28 . . . antiferromagnetic film, 31 . . . antiferromagnetic layer, 32, 34 . . . magnetic film, 35 . . . protection film, 36 . . . track width direction, 45 . . . first ferromagnetic film, 51 . . . magnetization in soft magnetic thin film, 52 . . . magnetization in magnetoresistive film, 53 . . . magnetization in hard magnetic thin film, 54 . . . 80 at. % Ni—Fe alloy film, 100 . . . sensing area, 111 . . . lower shield layer, 112 . . . upper shield layer, 121 . . . lower gap layer, 122 . . . upper gap layer, 201 . . . base, 202 . . . spindle, 203 . . . motor, 204a, 204b, 204c, 204d, 204e . . . magnetic disks, 205a, 205b, 205c, 205d, 205e . . . magnetic heads, 206 . . . carriage, 207 . . . voice coil, 208 . . . magnet, 209 . . . control circuit of voice coil motor, 210 . . . write/read circuit, 211 . . . interface, 212 . . . upper level unit, 213 . . . voice coil motor, 251 . . . non-magnetic underlayer, 252 . . . ferromagnetic underlayer.

EMBODIMENT 1

Figure 2:
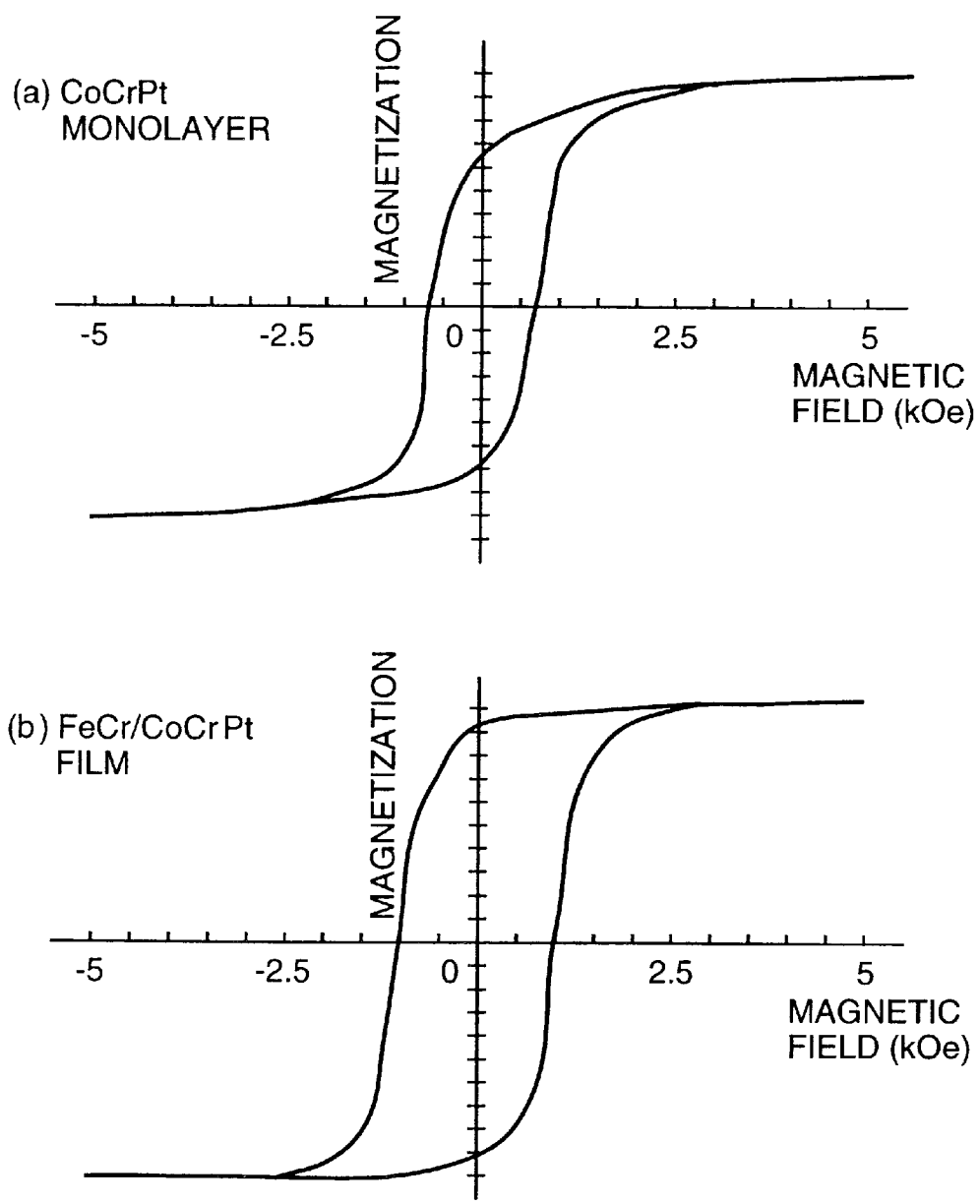
FIGS. 2(a) and 2(b) are characteristic diagrams for comparison of magnetic characteristics between a prior art monolayer hard magnetic film and a hard magnetic film of the invention in the form of a ferromagnetic thin film having a body-centered cubic structure as an underlayer, respectively.

An improvement in magnetic properties of a hard magnetic thin film formed on an underlayer according to the invention will be described in the following by way of an example utilizing an underlayer of an Fe—Cr alloy thin film having a crystal structure of a body-centered cubic lattice. FIGS. 2(a) and 2(b) compare magnetic properties in in-plane directions between a monolayer of a prior art Co—Cr—Pt hard magnetic thin. film (FIG. 2(a)) and a hard magnetic thin film of Co—Cr—Pt alloy formed on an Fe—Cr alloy thin film (hereinafter referred to as Fe—Cr/Co—Cr—Pt) according to the invention (FIG. 2(b)). Thin films are formed by a sputtering method. The thickness of the Co—Cr—Pt hard magnetic thin film is 40 nm whether or not an underlayer is used, and the thickness of the Fe—Cr alloy thin film is 10 nm. By way of example, the composition of the Co—Cr—Pt hard magnetic thin film is specified to be 69 at. % Co-14 at. % Cr-17 at. % Pt, and the composition of the Fe—Cr alloy thin film is specified to be 90 at. % Fe-10 at. % Cr. The monolayer film has the following magnetic properties: 610 oe of coercive force; a value of 200 G·μm as a product between the residual magnetic flux density and the film thickness (hereinafter referred to as a magnetization quantity); and a ratio of 0.73 between the residual magnetic flux density and the saturation magnetic flux density (hereinafter referred to as the squareness). On the other hand, the film of Fe—Cr/Co—Cr—Pt has the following magnetic properties: a coercive force of 1035 Oe; a magnetization quantity of 430 G·μm; and a squareness of 0.90. Here, the magnetization quantity represents the magnitude of the magnetic field produced from a magnetic film, and corresponds to the longitudinal bias field applied to the magnetoresistive film. Since an appropriate magnetization quantity required for the longitudinal bias layer in order to ensure a stable and high sensitivity operation of the MR head is one to two and a half times the magnetization quantity of the magnetoresistive film, a quantity sufficient to apply a required longitudinal bias field is ensured by this Fe—Cr/Co—Cr—Pt.

Since an optimal magnitude of the magnetization quantity in an MR head changes depending on the thickness of the magnetoresistive film and the like, in such instances, the thickness of the hard magnetic thin film can be changed accordingly. Further, when an Fe—Cr alloy thin film is utilized as an underlayer, the coercive force as well as the squareness are improved significantly. A greater value of coercive force is advantageous for stabilizing the longitudinal bias field and the like. Likewise, a greater value of squareness is advantageous since the thickness of the hard magnetic thin film can be reduced.

Figure 3:
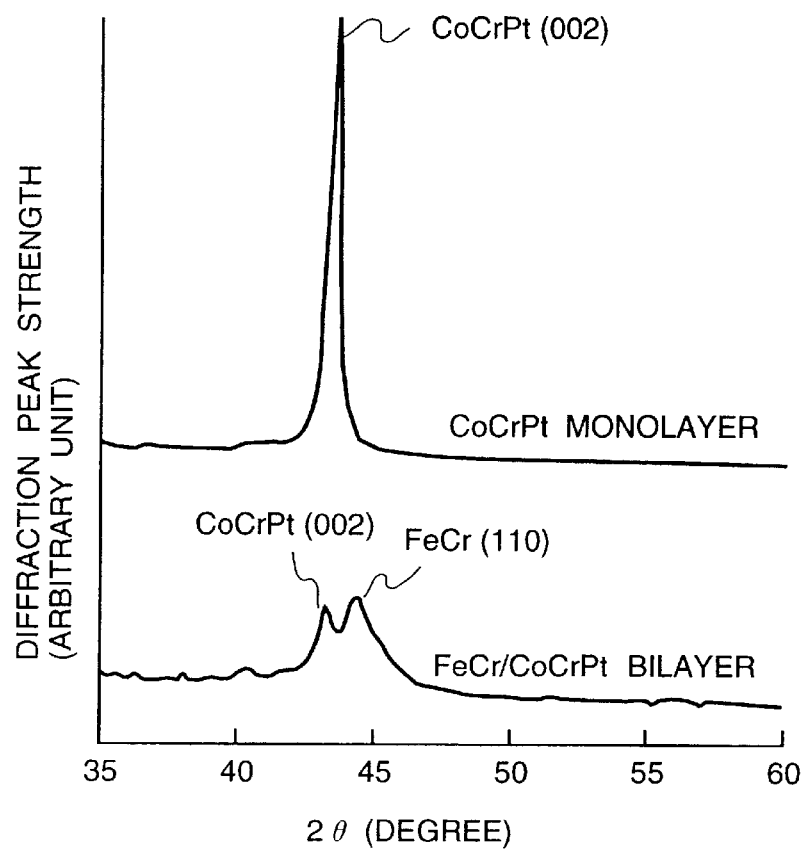
FIG. 3 is a characteristic diagram for comparison of X-ray profiles between the prior art monolayer hard magnetic film and the hard magnetic film of the invention in the form of a ferromagnetic thin film having a body-centered cubic structure as the underlayer.

The reason why the coercive force and magnetization quantity are small in the case of the monolayer film resides in the fact that the <001> direction of the crystal structure in the hard magnetic thin film is oriented perpendicular to the film plane. FIG. 3 is a diagram in which X-ray diffraction profiles of a Co—Cr—Pt monolayer film and a lamination film of Fe—Cr/Co—Cr—Pt are compared. Both films have their <001> crystal axes oriented perpendicular to their film planes, and have diffraction peaks of <002> plane. The strength of the diffraction peaks of <002>, however, is greater for the monolayer film, which is approximately 6 times as great as that of the laminated film, indicating that orientation of its <001> crystal axes is greater than that of the laminated film. The Co—Cr—Pt film is a hexagonal crystal, and has a strong magnetic anisotropy in <001> direction. Thereby,any such strong <001> orientation as that of the monolayer film will produce a perpendicular anisotropy, thereby reducing an in-plane component of magnetization. In the case where an underlayer of Fe—Cr alloy thin film is used, since the crystal structure of the underlayer is of a body-centered cubic lattice structure, and its <001> axis is orientated perpendicular to the film plane, a crystal orientation of the Co—Cr—Pt film disposed on this underlayer is considered to have been affected and changed its <001> orientation.

EMBODIMENT 2

Figure 4:
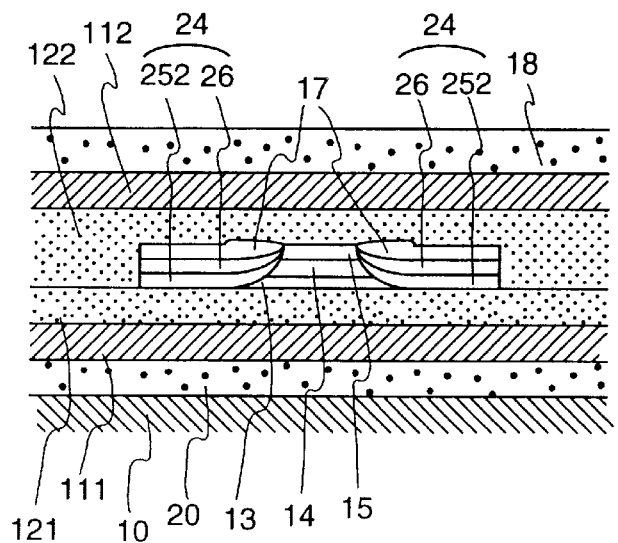
FIG. 4 is a cross-sectional view of an MR head in the vicinity of its sensing region which utilizes an anisotropic magnetoresistive film according to one embodiment of the invention.
Figure 5:
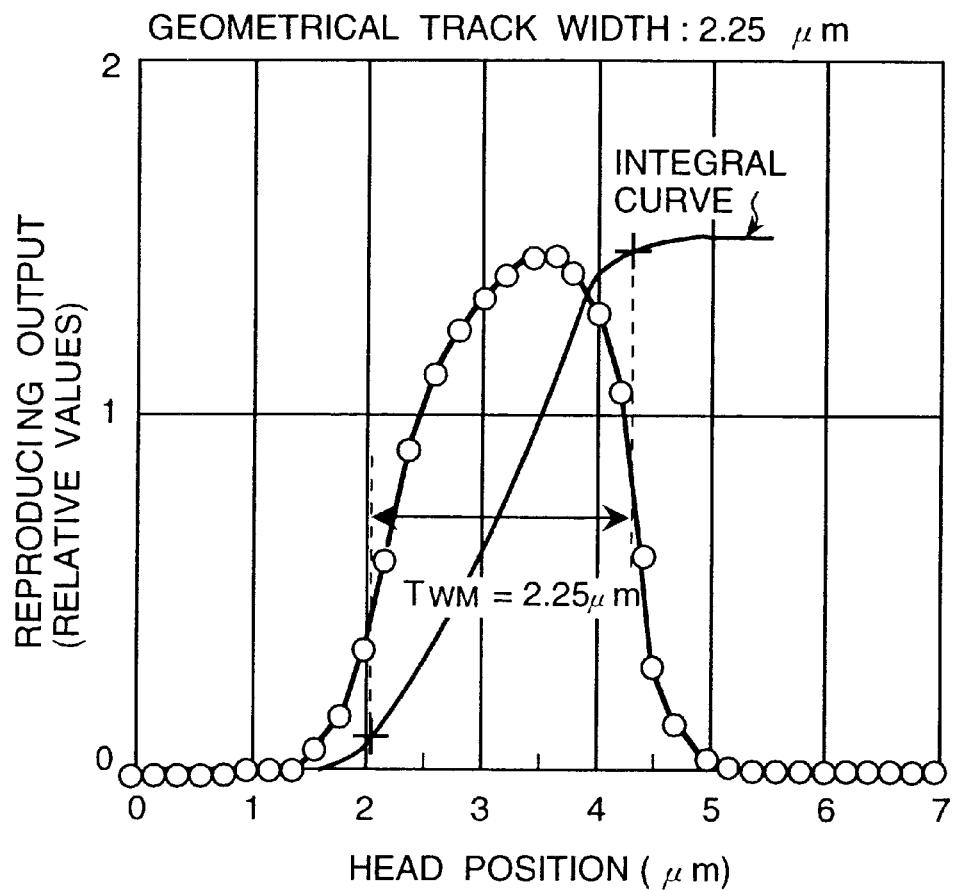
FIG. 5 is a diagram indicative of a distribution of sensitivity in the track direction of an MR head having a underlayer of a ferromagnetic material having a body-centered cubic lattice structure according to the invention.
Figure 6:
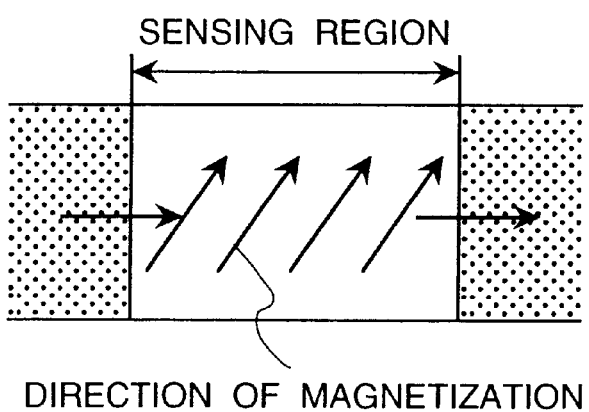
FIG. 6 is a schematic diagram indicative of a magnetization model according to the invention.

FIG. 4 is a cross-sectional view of an MR head in the vicinity of its sensing region which utilizes an anisotropic magnetoresistive film according to another embodiment of the invention.

As one of the features of this embodiment, a material which exhibits an anisotropic magnetoresistive effect is used as a magnetoresistive film. Further, a sputtering method is utilized for manufacture of these thin films, as will be described in detail in the following.

On non-magnetic substrate 10 made of ceramic there is formed an aluminum insulating film 20 to a thickness of approximately 10 $\mu$m, and the surface of the aluminum film is polished. As lower shield layer 111, a Co—Hf—Ta amorphous film is formed to a thickness of approximately 2 $\mu$m, which is then processed into a predetermined shape using an ion milling method. As lower gap layer 121, an aluminum film is formed to a thickness of 0.3 $\mu$m, on which are formed sequentially through lamination a Ni—Fe—Cr alloy thin film to a thickness of 40 nm serving as a soft magnetic thin film 13 for applying a transverse bias field, a Ta thin film to a thickness of 20 nm serving as a spacer 14, and a Ni—Fe alloy thin film to a thickness of 30 nm serving as a magnetoresistive film 15, thereby to provide a lamination of a soft magnetic thin film, a spacer film and a magnetoresistive film (hereinafter referred to as a soft magnetic thin film/spacer film/magnetoresistive film), which is processed into a predetermined shape. A lift-off mask film is formed on this lamination film at a position corresponding to a sensing region, and this lamination film is etched by an ion milling method in a manner such that a taper is formed along both sides expanding toward the bottom soft magnetic thin film/spacer film/magnetoresistive film, so that only a portion of the lamination film corresponding to a sensing region remains unetched.

Then, as a longitudinal bias layer 24, an Fe—Cr alloy thin film is formed to a thickness of 10 nm to form underlayer 252, which has a face-centered cubic lattice crystal structure and exhibits ferromagnetism, and a Co—Pt—Cr hard magnetic thin film is formed on the underlayer to provide hard magnetic thin film 26 to a thickness of 40 nm. An Au thin film is formed thereon to a thickness of 0.2 $\mu$m to form electrode 17 for reading out a change of electrical resistance in the magnetoresistive film 15. Removal of the lift-off mask completes the formation of sensing region. Then, upper gap layer 122 made of alumina film is formed to a thickness of 0.3 $\mu$m, and upper shield layer 112 made of Ni—Fe alloy film is formed to a thickness of approximately 2 $\mu$m, sequentially. Further, insulating film 18 is formed thereon, and manufacture of a reading head is completed. Afterwards, on the reading head, an inductive head for recording head will be manufactured, the details of which manufacture will be omitted.

After completion of the film, a direct current magnetic field of 5 k Oe is applied to the longitudinal bias layer 24 in a longitudinal direction of the magnetoresistive film (in the horizontal direction of the drawing) so as to magnetize the longitudinal bias layer 24. Then, dicing of the substrate to form a slider is effected, and manufacture of an MR head is completed.

For this embodiment, a longitudinal bias field derived from the longitudinal bias layer 24 can be applied not only to the magnetoresistive film 15, but also to the soft magnetic thin film 13, thereby enabling suppression of Barkhausen noise due to the soft magnetic thin film 13. Further, since the magnetoresistive film 15 is limited to only the signal region, an excellent magnetic head having superior off-track characteristics can be obtained.

A magnetoresistive head according to the embodiment 2 of the invention is shown to have a soft magnetic thin film 13, a magnetoresistive film 15 and an electrode 17 disposed in this sequence from the side of the substrate; however, the invention is not limited to this sequence, and any change in this sequence will fall within the scope of the invention.

According to one aspect of this embodiment of the invention, means for applying a transverse bias field is implemented by the provision of the soft magnetic thin film 13, which is disposed via spacer film 14 adjacent to the magnetoresistive film; however, the invention is not limited thereto, and any other application method may be employed according to the invention.

Further, as longitudinal bias layer 24, a lamination layer of Fe—Cr to a thickness of 10 nm/Co—Cr—Pt to a thickness of 40 nm is utilized; however, since this is only one aspect of this preferred embodiment, the invention is not limited to this specified thickness or to this specified combination of materials so long as a magnetization quantity is applied to this longitudinal bias layer in a range from one to two and a half times the magnetization quantity of the magnetoresistive film. Adjustment of the magnetization quantity can be achieved by changing the film thickness of each of underlayer 252, which exhibits ferromagnetism, and hard magnetic thin film 26, since they are coupled ferromagnetically. Further, if the magnetization quantity of the longitudinal bias layer is sufficiently large, the adjustment becomes possible also by causing the direction of magnetization to tilt from a lengthwise direction of the magnetoresistive film to the direction of height thereof (i.e., vertical to the plane of the drawing).

Figure 7:
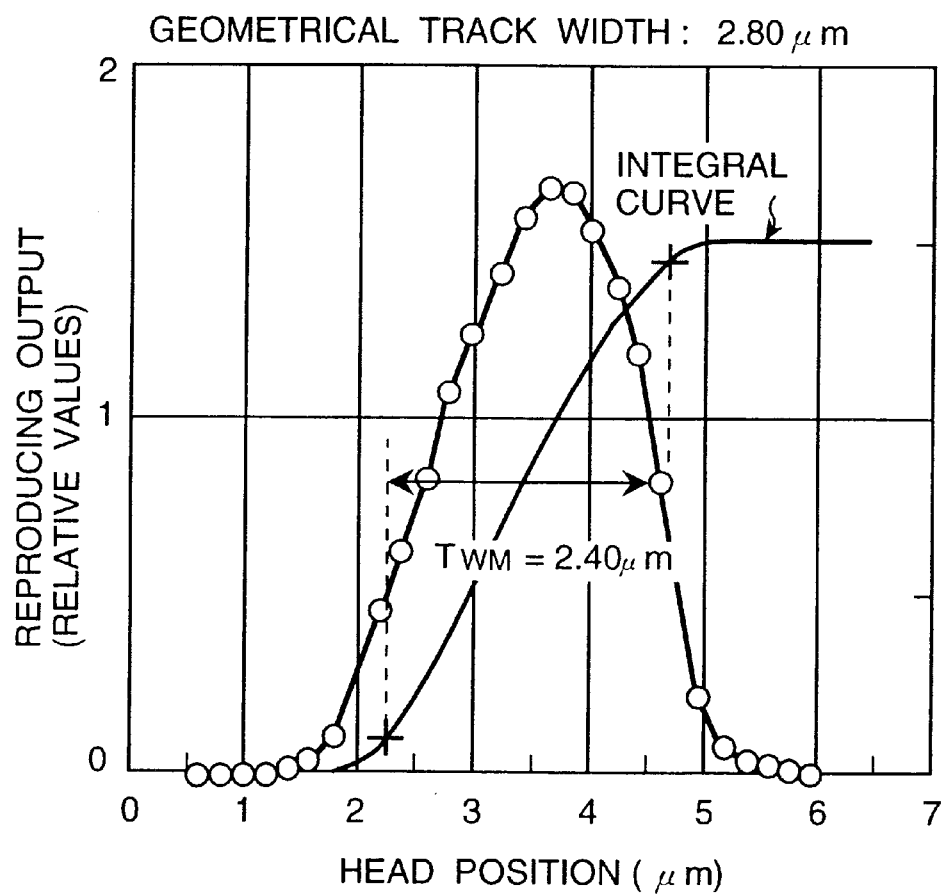
FIG. 7 is a diagram indicating a sensitivity distribution in the track direction of a prior art MR head using a Cr underlayer.
Figure 8:
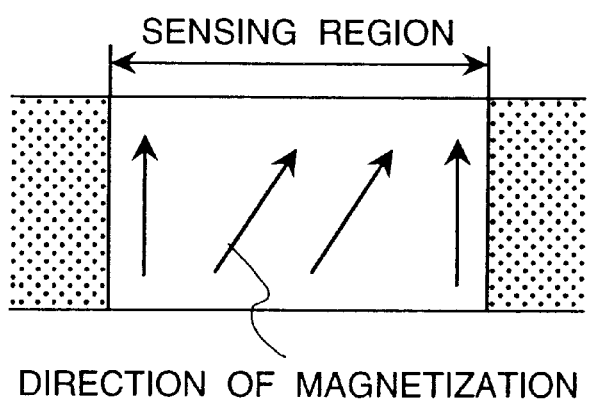
FIG. 8 is a schematic diagram indicative of a magnetization model according to the prior art.

With reference to FIGS. 5 to 8, in order to investigate the effect of magnetic exchange coupling between the hard magnetic thin film and the magnetoresistive film, the distributions of the sensitivity in track directions are compared between the MR head of the invention (FIGS. 5 and 6) and an MR head using non-magnetic Cr as an underlayer (FIGS. 7 and 8). The method employed to obtain this track profile measurement will be described. This track profile is obtained through the steps of writing a signal in a very narrow track as small as approximately 0.4 $\mu$m on a disk, reading this recorded signal by moving the MR head in a radial direction of the disk, and determining a reproducing output at each portion of the MR head. Therefore, the abscissa of the drawing represents a travel distance, and the ordinate thereof represents a reproducing output at each travel distance. Through such measurements of distributions of sensitivity in the track direction of the MR head, a reproducing sensitivity of the MR head is represented by a distribution curve having a peak value in the center thereof and lower values on both sides thereof, namely, having a single main peak distribution. The actual reproducing voltage is considered to correspond to a value obtained by integrating these signals in the track direction. In the MR head with a non-magnetic underlayer having a reproducing output as indicated in FIG. 7, the geometrical track width (the distance between a pair of electrodes) is 2.8 μm, and the magnetic track width $T_{WM}$ is 2.4 μm, which is a reduction by 0.4 μm of the geometrical width. Here, the magnetic track width is defined to correspond to a width of the integral curve which covers a range from 58 to 95% of a total value of integration for each output at each point in the track direction in the drawing. Therefore, the magnetic track width corresponds to an effective track width of the MR head. The reason why the magnetic track width is reduced as described above is due to that fact a direction of magnetization in the side portions of the magnetoresistive film is oriented partially in the normal line direction of the disk, as indicated by a magnetization model in FIG. 8. When any magnetization in the side portions is oriented in the normal line direction, magnetization of the magnetoresistive film does not rotate even when a magnetic field signal from the recording medium is applied, thereby in consequence, lowering the sensitivity in the vicinity of the side portions.

In this magnetic head, since there exists a dead zone in the side portions of the sensing region, its output voltage is decreased. On the other hand, in the MR head using a ferromagnetic thin film as a underlayer according to the invention (FIG. 5), its magnetic track width Tw is 2.25 μm with respect to its geometrical track width of 2.25 μm, thereby substantially providing the same track width to the geometrical and the effective track widths. This is because that magnetization in the side portions of the magnetoresistive film of the MR head according to the invention is not oriented in the nominal direction of the disk, and so there exists no dead zone which appears in the MR head using the non-magnetic underlayer, thereby producing a significantly improved output. Here, the magnetization model in FIGS. 6 and 8 has oblique components of magnetization in its sensing region, which is due to the fact that a transverse bias field is applied to the magnetoresistive film.

As a result of the foregoing, it is confirmed that there exists a clear difference in the configuration of magnetization in the side portions of a sensing region between an MR head using a non-magnetic underlayer and an MR head according to the invention. This difference results from whether or not there exists a mutual magnetic coupling between the hard magnetic thin film and the magnetoresistive film or soft magnetic thin film. In the MR head of the invention, since magnetization in both the hard magnetic thin film and the magnetoresistive film are coupled by mutual magnetic coupling via the magnetic underlayer, the direction of magnetization in the side portions of the magnetoresistive film and the soft magnetic thin film is oriented in the same direction as the direction of magnetization in the hard magnetic thin film. In this instance, since magnetization in the hard magnetic thin film is magnetized in the track direction of the MR head, magnetization of the magnetoresistive film and the soft magnetic thin film is aligned to the track direction. On the other hand, in the MR head using a non-magnetic underlayer, there exists no mutual magnetic coupling between its hard magnetic thin film and its magnetoresistive film as well as the soft magnetic thin film. It is known that, for any MR head which has a complicated laminated structure of insulating films made of ceramics and of metal films, there occurs an excessive stress concentration due to the complicated structure. Therefore, in particular, in such a region as the side portions of the sensing region which were subjected to etching, an excessive stress concentration is likely to occur. When a stress is applied to a magnetoresistive film, magnetization therein tends to be directed in the direction of stress in accordance with its magnetostriction (or is resistant to be so directed depending on the sign of its magnetostriction). Rotation of magnetization in the side portions of the sensing region of the MR head using non-magnetic underlayers is considered to have occurred due to such stress concentration. In the presence of the magnetic exchange coupling realized by the hard magnetic thin film of the invention, instability of magnetization which is likely to occur in the side portions of the sensing region can be prevented from occurring.

EMBODIMENT 3

Figure 1:
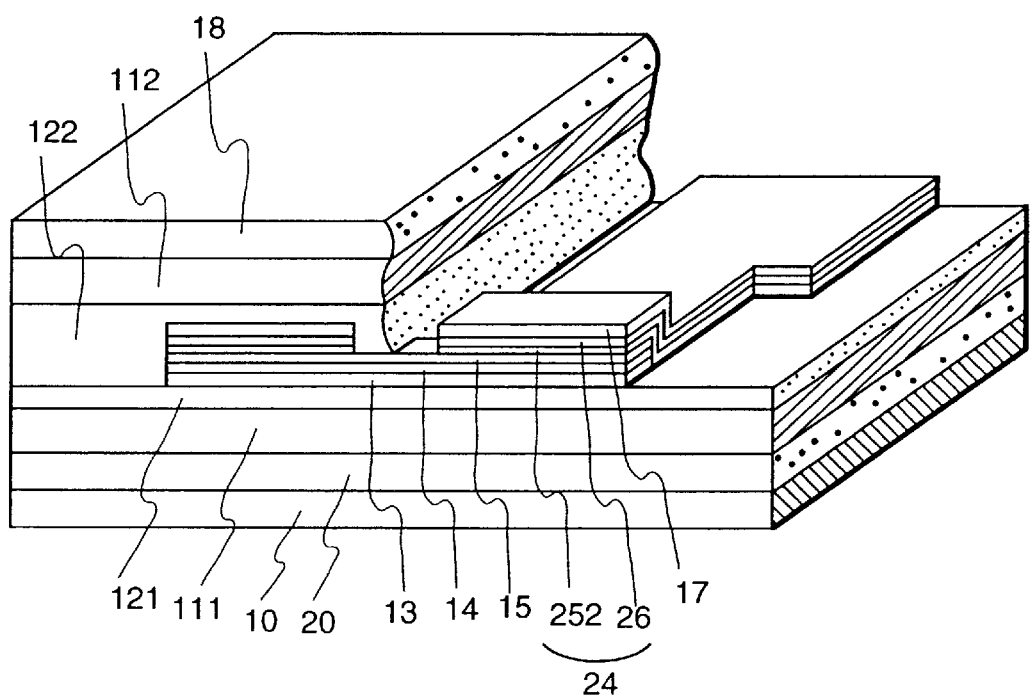
FIG. 1 is a diagrammatic perspective view partly in section of a magnetoresistive head according to the invention.
Figure 9:
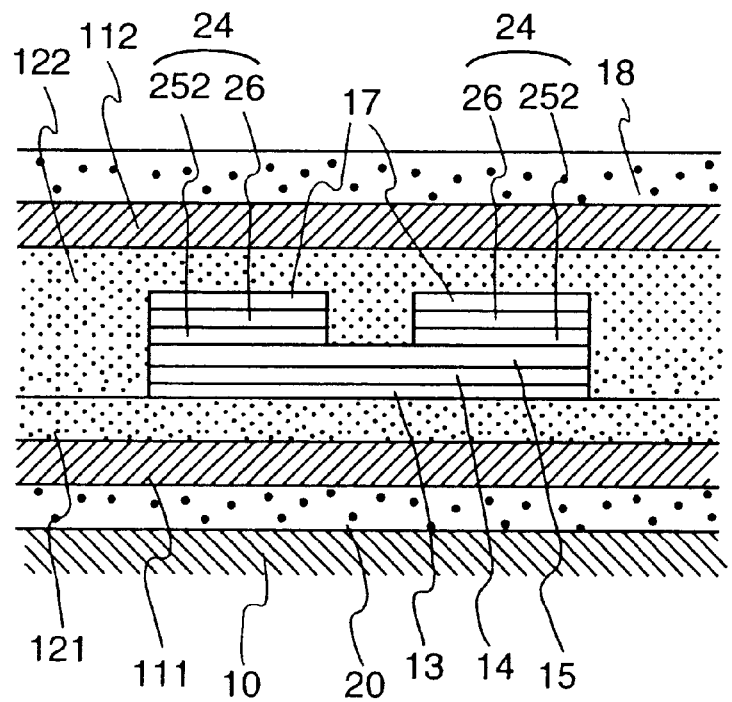
FIG. 9 is a cross-sectional view of another MR head in part in the vicinity of its sensing region which utilizes the anisotropic magnetoresistive effect according to another embodiment of the invention.

FIG. 1 is a perspective view indicative of the structure of a magnetoresistive head forming a embodiment 3 of the invention, and FIG. 9 is a cross-sectional view in part of the embodiment 3 in the vicinity of its sensing region.

The steps of manufacture of the MR head utilizing an anisotropic magnetoresistive effect according to this embodiment of the invention are the same as the steps of manufacture of the preceding embodiment 2 up to the formation of a lamination of a soft magnetic thin film/spacer film/magnetoresistive film. Then, this soft magnetic thin film/spacer film/magnetoresistive film is processed into a pattern of predetermined shape. After forming a lift-off mask on an area corresponding to a sensing region, longitudinal bias layer 24 is formed by depositing an Fe—Cr alloy thin film, having a body-centered cubic structure and exhibiting a ferromagnetism, as its underlayer 252, and a Co—Cr—Pt alloy hard magnetic thin film is formed as its hard magnetic thin film 26 followed by formation of an Au thin film as electrode film 17 thereon. Then, the lift-off mask is removed so as to provide a sensing region. The other steps which follow are the same as in the preceding embodiment 2.

Figure 15:
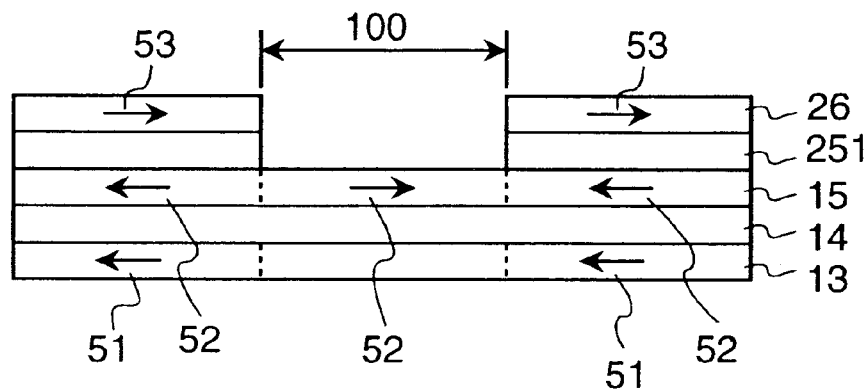
FIG. 15 is a diagram indicative of a film structure of a prior art MR head.
Figure 16:
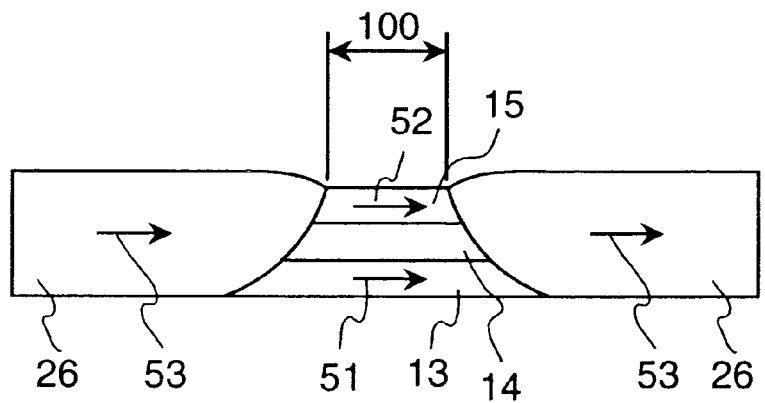
FIG. 16 is a diagram indicative of a film structure of another prior art MR head.
Figure 17:
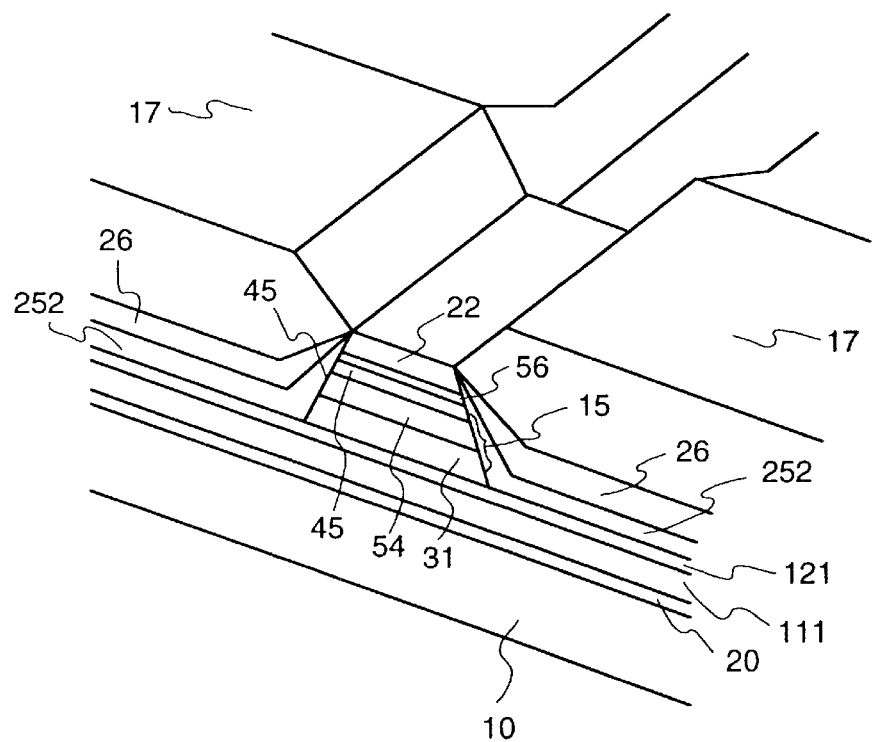
FIG. 17 is a perspective view of a magnetoresistive head in the vicinity of its sensing region utilizing the multi-layered magnetoresistive film according to the invention.

When a non-magnetic thin film such as Cr is used as an underlayer, as indicated in FIG. 15, a portion of a magnetic field derived from the hard magnetic thin film returns through the ferromagnetic thin film which constitutes an MR element below the hard magnetic thin film, whereby, the direction of magnetization in the sensing region of the magnetoresistive film and the direction of magnetization in areas other than the sensing region thereof become oriented in opposite directions from each other. On the other hand, when a ferromagnetic underlayer is used, the direction of magnetization in the sensing region is oriented in the same direction as the direction of magnetization in the longitudinal bias layer by the magnetic field derived from the longitudinal bias layer, and also the direction of magnetization in the areas other than the sensing region is oriented in the same direction as the direction of magnetization in the longitudinal bias layer due to the mutual magnetic coupling between the longitudinal bias layer and the magnetoresistive film. Accordingly, since there is formed no magnetic domain wall in the magnetoresistive film, an improved MR head free from Barkhausen noise can be provided.

EMBODIMENT 4

The present invention is also capable of being applied to an MR head which utilizes a giant magnetoresistive effect.

Figure 10:
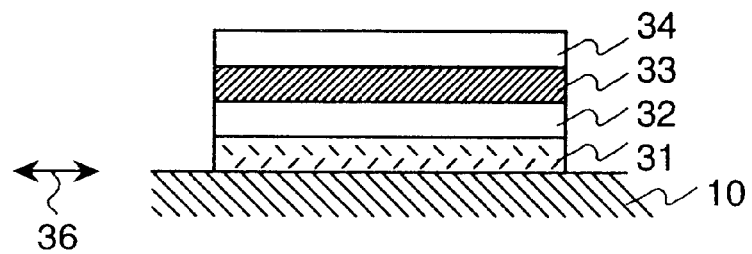
FIG. 10 is a schematic diagram indicative of a multi-layered magnetoresistive film which exhibits a giant magnetoresistive effect.

One of the most simple and basic lamination structures which exhibit a giant magnetoresistive effect is shown in FIG. 10, which comprises antiferromagnetic layer 31/magnetic thin film 32/non-magnetic conductive thin film 33/magnetic thin film 34. The direction of magnetization in the magnetic thin film 32 is fixed perpendicular to the track directions, i.e., perpendicular to the plane of the drawing, by exchange coupling interaction with antiferromagnetic layer 31. Magnetic anisotropy in the track direction is induced in magnetic thin film 34, so that, with no application of an external magnetic field, the directions of magnetization in the magnetic thin film 32 and magnetic thin film 34 are perpendicular to each other. When an external magnetic field is applied, the direction of magnetization in the magnetic thin film 34 is caused to rotate, changing the angle relative to the direction of magnetization in the magnetic thin film 32, thereby causing the electrical resistance to change. Generally, as antiferromagnetic layer 31, an Fe—Mn alloy antiferromagnetic film, Ni—Mn alloy antiferromagnetic film, or NiO antiferromagnetic film may be used, and as magnetic thin films 32 and 34, a Ni—Fe alloy thin film may be used, and as non-magnetic conductive thin film 33, a Cu thin film may be used. Further, the longitudinal bias field is applied to magnetic thin film 34 in which the magnetization rotates.

EMBODIMENT 5

Figure 11:
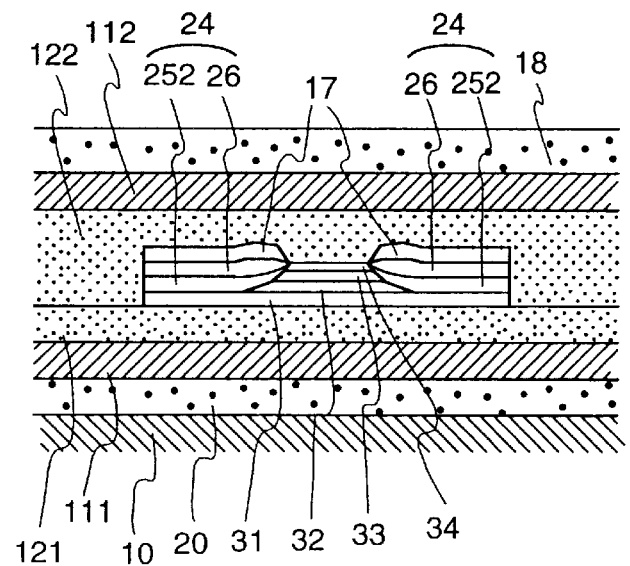
FIG. 11 is a cross-sectional view of another MR head in the vicinity of its sensing region utilizing the multi-layered magnetoresistive film according to the invention.

FIG. 11 is a cross-sectional view in part in the vicinity of a sensing region of an MR head using a multi-layered magnetoresistive film comprising the above-mentioned lamination structure according to another embodiment of the invention. The steps of manufacture of this MR head up to the step of manufacture of lower gap layer 121 are the same as those of the MR head utilizing the anisotropic magnetoresistive effect described above. On the surface of lower gap layer 121 are formed a NiO antiferromagnetic thin film as an antiferromagnetic layer 31 to a thickness of 100 nm, a Ni—Fe alloy thin film as a magnetic thin film 32 to a thickness of 5 nm, a Cu thin film as a non-magnetic conductive thin film 33 to a thickness of 3 nm, a Ni—Fe alloy thin film as a magnetic thin film 34 to a thickness of 12 nm, then a Ta thin film as a protective coat 35 to a thickness of 3 nm. This multi-layered film is processed into a predetermined form, and a lift-off mask is formed on the surface of an area corresponding to a sensing region. The other area not covered by the lift-off mask is removed leaving only a sensing region using an ion milling method in a manner such that a taper is formed on both sides expanding toward the bottom of the multi-layered magnetoresistive film. Then, the longitudinal bias layer 24 of the invention is formed, for example, by sequentially forming an Fe-10 at. % Cr alloy thin film to a thickness of 5 nm having a body-centered cubic lattice, and exhibiting ferromagnetism as the underlayer 252, and a Co—Pt—Cr alloy hard magnetic thin film to a thickness of 14 nm as the hard magnetic thin film 26, followed by formation of an Au thin film to a thickness of 0.2 μm as the electrode 17. By way of example, a lamination layer prepared on a glass substrate of Fe-10 at. % Cr alloy thin film of 5 nm thickness/Co—Pt—Cr alloy hard magnetic thin film of 14 nm thickness has shown to have a coercive force of 1500 Oe, a squareness of 0.85, and a residual magnetic flux density of 0.87 T. Next, the lift-off mask is removed completing formation of the sensing region. The subsequent steps will be omitted since they are the same as in the preceding embodiment.

After completion of all the steps of forming these thin films, as described above, a heat treatment process is required to cool the temperature from above the Neel temperature of the antiferromagnetic layer under application of a d.c. magnetic field in order to provide a magnetic exchange coupling between antiferromagnetic layer 31 and magnetic thin film 32 such that the direction of magnetization in the magnetic thin film 32 is fixed in a direction perpendicular to the track direction, i.e., in a direction perpendicular to the plane of the drawing. Then, the longitudinal bias layer is magnetized in a longitudinal direction of the multi-layered magnetoresistive structure i.e. in the horizontal direction of the drawings, and then, the substrate is cut out, and diced into a slider to complete the manufacture of the MR head.

For the purpose of comparison of Barkhausen noise suppression capability, a similar magnetoresistive head is manufactured utilizing as its longitudinal bias layer a Cr thin film with 5 nm thickness/Co—Pt—Cr alloy hard magnetic thin film with 27 nm thickness, which magnetization quantity is almost the same as that of the above-mentioned Fe-10 at. % Cr/Co—Pt—Cr longitudinal bias layer. While the suppression rate, which is the number of magnetoresistive heads free from Barkhausen noise divided by that of the measured magnetoresistive heads, was 100% for the head utilizing Fe-10 at. % Cr alloy thin film with nm thickness/Co—Pt—Cr alloy hard magnetic thin film with 14 nm thickness, it was 70% for the head utilizing Cr thin film with 5 nm/Co—Pt—Cr alloy hard magnetic thin film with 27 nm thickness. By way of example, a lamination layer prepared on a glass substrate of Cr thin film with 5 nm thickness/Co—Pt—Cr alloy hard magnetic thin film with 27 nm thickness indicated magnetic properties, such as coercive force of 1700 Oe, a squareness of 0.90 and a residual magnetic flux density of 0.59 T.

In this embodiment 4 of the invention, the MR head is described as a lamination of films sequentially disposed from the side of its substrate in the order of antiferromagnetic layer 31/magnetic thin film 32/non-magnetic conductive thin film 33/magnetic thin film 34, and electrode thin film 17; however, the invention is not limited thereto, and any modification in the order of film formation should be construed to fall within the scope of the invention. However, in the case when the films are in the order of magnetic thin film 34/non-magnetic conductive thin film 33/magnetic thin film 32/antiferromagnetic layer 31, it is preferable for anti-ferromagnetic layer 31 to be a conductive antiferromagnetic film, such as an Fe—Mn alloy antiferromagnetic thin film, Ni—Mn alloy antiferromagnetic thin film, and the like.

EMBODIMENT 5

FIG. 19 is a perspective view of a magnetoresistive head of still another embodiment according to the invention.

This embodiment 5 has substantially the same structure as the embodiment 4 except for the laminated structure of its magnetoresistive head. On the surface of lower gap layer 121 made of alumina, there is formed an antiferromagnetic layer 31 made of NiO to a thickness of 50 nm, then sequentially, there is formed a magnetic thin film 32 which includes 80 at. % Ni—Fe alloy film 54 to a thickness of 1 nm and Co film 45 to a thickness of 1 nm, then non-magnetic conductive thin film 33 is formed of Cu to a thickness of 2 nm, and soft magnetic film 32 made of Ni—Fe alloy is formed to a thickness of 5 nm.

Using as the antiferromagnetic layer an oxide film of NiO, which has a higher resistance to corrosion during manufacture than Fe—Nm, which is a conventional material, an improved reliability in mass production has been achieved.

Further, the output from the head is determined by a product of the current which flows through the head and the change of resistance in the multi-layered magnetoresistive film, so that the antiferromagnetic layer itself does not contribute at all to the change of resistance in the multi-layered magnetoresistive film. Thereby, through use of NiO, which is an insulating material, as the antiferromagnetic layer, it has become possible to cause an input current effectively to contribute to a resistance change, thereby to obtain an improved sensitivity to magnetic fields. Accordingly, a recording density as high as approximately 5 Gb/in$^2$ can be achieved by this embodiment 5 of the invention.

EMBODIMENT 6

Figure 12:
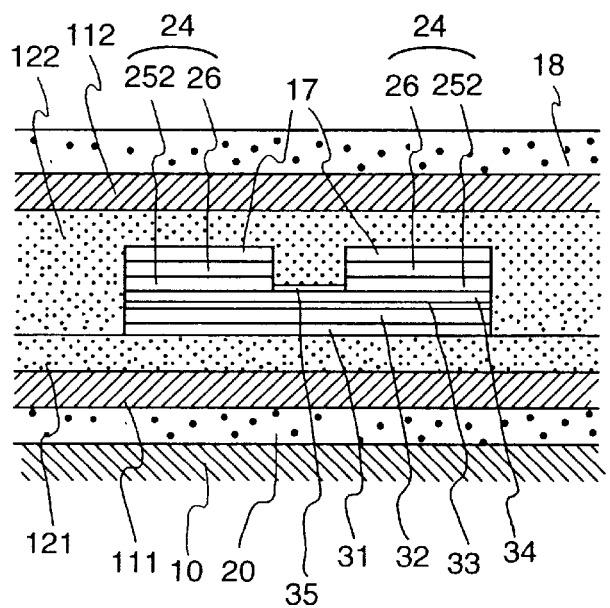
FIG. 12 is a cross-sectional view of still another MR head in the vicinity of its sensing region utilizing the multi-layered magnetoresistive film according to the invention.

An MR head having a multi-layered magnetoresistive film comprised of an antiferromagnetic layer/magnetic thin film/ non-magnetic conductive thin film/magnetic thin film is also capable of being provided in a structure as indicated in FIG. 12 having longitudinal bias layer 24 and electrode 17 disposed on both sides of the multi-layered magnetoresistive film.

EMBODIMENT 7

Figure 18:
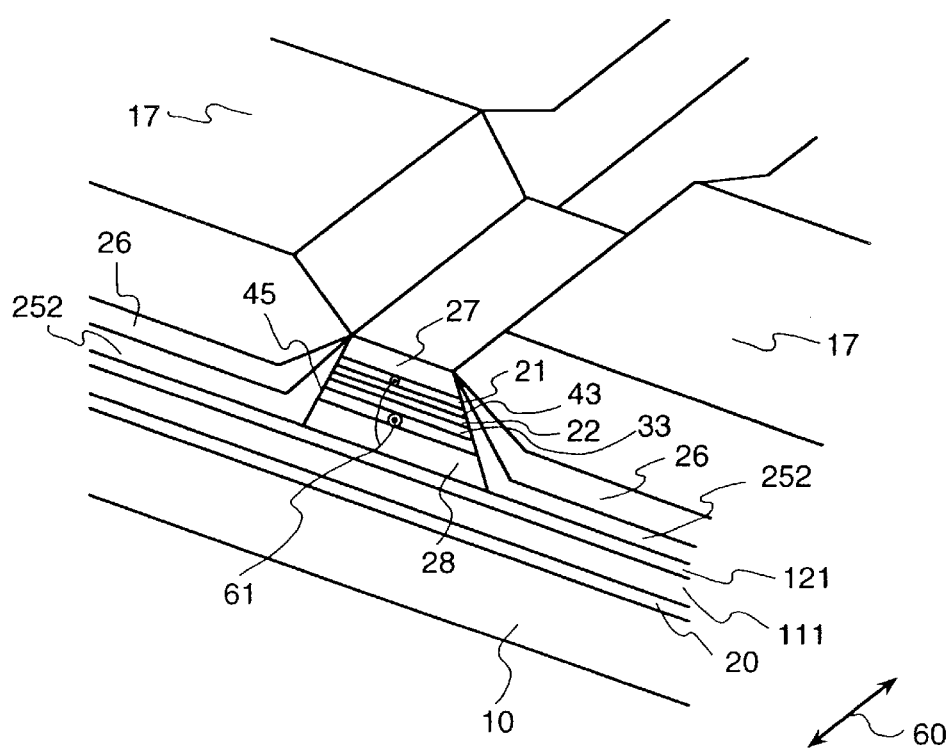
FIG. 18 is a perspective view of a magnetoresistive head in the vicinity of its sensing region utilizing the multi-layered magnetoresistive film according to the invention.

FIG. 18 is a perspective view of a magnetoresistive head of a further embodiment of the invention.

Antiferromagnetic layers 27 and 28 apply one-directional anisotropy to magnetic thin films 21 and 45 by mutual magnetic coupling. The longitudinal bias layer has the same structure as that of embodiment 4. Soft magnetic film 22, which is separated by first and second non-magnetic conductive films 33 and 43 from first and second ferromagnetic films 45 and 21, respectively, has the direction of easy magnetization impressed by an induced uniaxial anisotropy. This is achieved by applying a magnetic field in a predetermined direction to this magnetic film during its deposition. This embodiment 7 of the invention is one example in which application of anisotropies is realized by mutual magnetic coupling and by the induced magnetization anisotropy, the directions of which are perpendicular to each other within the film plane. By causing the anisotropies in the ferromagnetic films 45 and 21 to become large and the anisotropy in the soft magnetic film 22 to become small in comparison with the magnitude of the magnetic field to be sensed, it becomes possible to substantially fix the magnetizations in the ferromagnetic films 45 and 21 relative to an external magnetic field, and to allow the magnetization in the soft magnetic film 22 alone to respond with a high sensitivity to the external magnetic field. Further, with respect to a magnetic field applied in the direction of arrow 60 and to be sensed, the magnetizations in ferromagnetic films 45 and 21 are caused by anisotropy 61 to be excited in the axis of easy magnetization, i.e. its magnetization and the external magnetic field are parallel; while on the contrary, the magnetizations are caused by the anisotropy of soft magnetic film 22 to be excited in the axis of hard magnetization, i.e. its magnetization and the external magnetic field are perpendicular to each other. By this effect, the above-mentioned high sensitivity response can be further enhanced, and since the multi-layered magnetoresistive element is driven under such a condition, the external field excites the magnetization in the soft magnetic film to cause it to rotate, without magnetic domain movement, because of excitation in the axis of hard magnetization. Thus, Barkhausen noise associated with magnetic domain movement can be prevented, and operation at high frequencies can be implemented.

Films which constitute the magnetoresistive element of this embodiment 7 are manufactured using high frequency magnetron sputtering equipment. Applying a magnetic field of approximately 59 Oe in two orthogonal directions in the plane of the substrate with two pairs of electromagnets during film deposition, one directional anisotropy by mutual magnetic coupling between the ferromagnetic films and antiferromagnetic layers, as well as a uniaxial anisotropy in the soft magnetic film 22, are induced in each direction.

Alternatively, by heat treatment under application of a magnetic field at Neel temperatures of the antiferromagnetic layers after formation of a multi-layered film, the directions of the one-directional anisotropy are induced in the direction of the magnetic field.

Also, in an MR head utilizing the giant magnetoresistive effect described in embodiments 4 to 7, the magnetization a quantity in the longitudinal bias layer has a significant influence on the stability and reproducing output of the head. An optimal magnetization quantity in the longitudinal bias layer is one to three times the magnetization quantity in the magnetic thin film 34 or soft magnetic film 22.

EMBODIMENT 8

Hereinabove, the longitudinal bias layer according to the invention has been illustrated by way of example as an underlayer in the form of a ferromagnetic thin film having a body-centered cubic lattice structure; however, the invention is not limited thereto, and substantially the same effect can be obtained when an amorphous ferromagnetic thin film or an antiferromagnetic thin film having a body-centered cubic lattice structure is used.

A material suitable for use as the amorphous ferromagnetic thin film of the invention includes an amorphous alloy containing as its main components Co and at least one element selected from the group consisting of Ti, V, Cr, Zr, Nb, Mo, Hf, Ta, Y, Ru, Rh, Pd, Cu, Ag, Au and Pt. A typical example of such materials includes a Co—Zr—Nb alloy thin film, a Co—Zr—Ta alloy thin film, a Co—Hf—Nb alloy thin film, Co—Hf—Ta alloy thin film. These materials are formed by a sputtering method; however, when the content of Co exceeds 90 at. %, no amorphous state results, and when the content is less than 70 at. %, magnetization is likely to be lost. As a result, preferably, the upper limit of the Co content is 90 at. %, and the lower limit thereof is 70 at. %.

Figure 13:
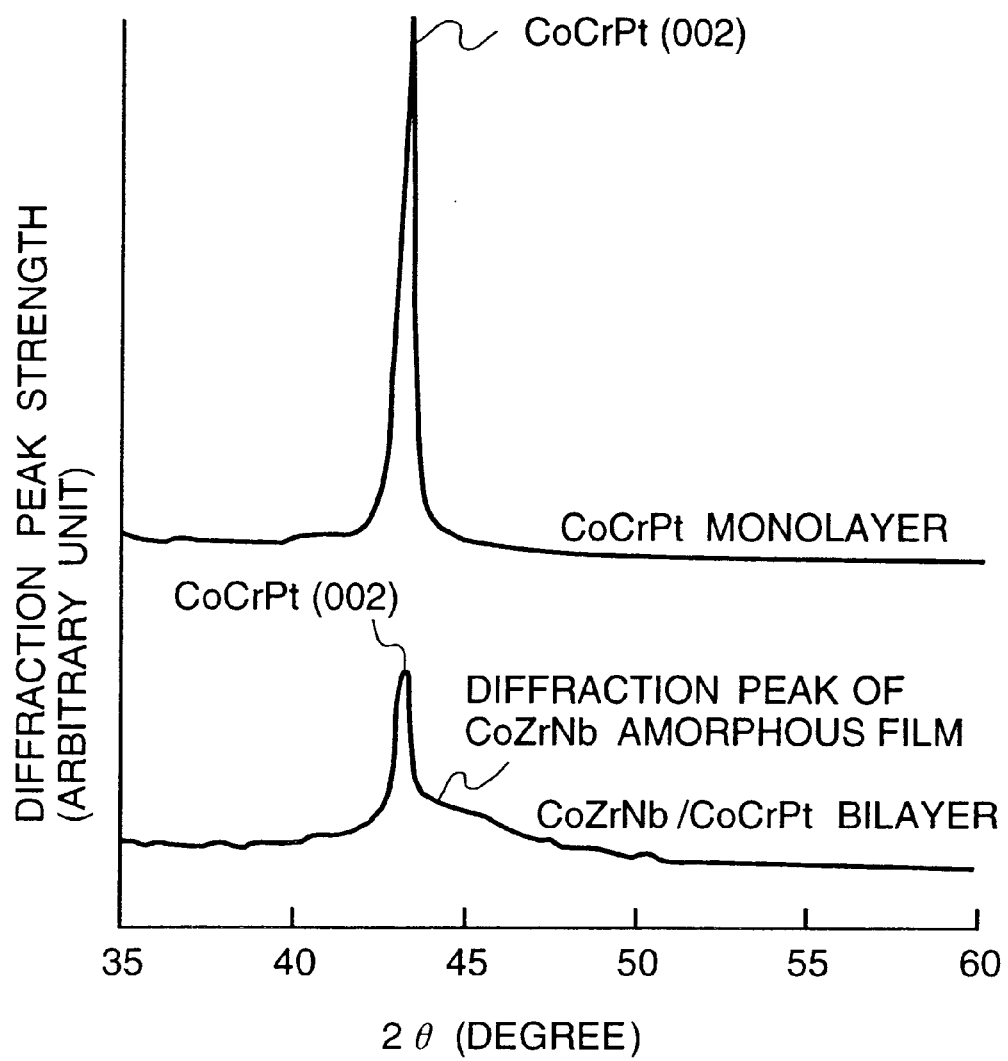
FIG. 13 is a diagram for comparison of X-ray profiles between the prior art monolayer hard magnetic thin film and the hard magnetic thin film which utilizes an amorphous ferromagnetic thin film as an underlayer according to the invention.

FIG. 13 compares X-ray diffraction profiles obtained with a Co—Cr—Pt monolayer and with a lamination film of Co—Zr—Nb/Co—Cr—Pt which uses as its underlayer a Co—Zr—Nb alloy thin film to a thickness of 20 nm, which is an example of an amorphous ferromagnetic thin film, and on the surface of which is laminated a Co—Cr—Pt alloy hard magnetic thin film. It is noted from the profile of the Co—Zr—Nb/Co—Cr—Pt lamination that there exists a broad diffraction peak due to the Co—Zr—Nb alloy thin film, and a diffraction peak thereof due to the <002> plane of Co—Cr—Pt, and that a <001> crystal axis of the Co—Cr—Pt thin film is oriented perpendicular to its film plane. When the strength of the diffraction peak of Co—Cr—Pt <002> of Co—Zr—Nb/Co—Cr—Pt is compared with that of the Co—Cr—Pt monolayer and of the Fe—Cr/Co—Cr—Pt lamination of FIG. 3, it is found to be approximately one third of that of the Co—Cr—Pt monolayer, but is about twice that of Fe—Cr/Co—Cr—Pt. Thereby, it is concluded from these findings that the degree of orientation of the <001> in Co—Zr—Nb/Co—Cr—Pt is smaller than that in the monolayer but is higher than that in Fe—Cr/Co—Cr—Pt. Since Co—Cr—Pt has a strong magnetic anisotropy in the direction of the <001> axis, the smaller the strength of diffraction in the Co—Cr—Pt <002> is, the greater will be the component of magnetization within its in-plane. Thereby, use of Co—Zr—Nb alloy amorphous ferromagnetic thin film as a underlayer can also improve the magnetic property of the hard magnetic thin film, although its effect is not as great as that of the Fe—Cr alloy ferromagnetic film.

As a material suitable for use as an antiferromagnetic thin film having a crystal structure of a body-centered cubic lattice, an alloy containing as its main components Cr, Mn and at least one element selected from the group consisting of Cu, Au, Ag, Ni, Co, Ru, Rh, Pt, Re, Os, Ir and Pt can be used. A preferred range of compositions of these elements when given in terms of $(Cr_{100-c}MN_c)_{100-d}X_d$, where X represents an added element, is specified as $30 \leq c \leq 70$, $0 \leq d \leq 30$. This range of compositions ensures the maximum magnetic exchange coupling interaction. As to the thickness of the film, a film thickness of 20 nm or more is required, since for a film thickness thinner than 20 nm, no antiferromagnetism is exhibited. The degree of improvement in the magnetic properties of the hard magnetic thin film is substantially the same as that obtained when the ferromagnetic thin film having a crystal structure of body-centered cubic lattice was used.

When using this antiferromagnetic thin film as an underlayer, it is desirable, in order to align the direction of magnetization in the antiferromagnetic thin film in the longitudinal direction of a magnetoresistive film, to subject the same to a heat treatment in a dc magnetic field. In the case of an MR head which employs a multi-layered magnetoresistive film utilizing a giant magnetoresistive effect, antiferromagnetic layer 31 is provided to fix the direction of magnetization in the magnetic thin film 32, as indicated in FIG. 10. Since the directions of magnetization of the antiferromagnetic layer 31 and an antiferromagnetic thin film serving as a underlayer in a longitudinal bias layer are different, it is necessary for them to use a different material having a different blocking temperature, or to select as the antiferromagnetic thin film for the underlayer of the longitudinal bias layer some other composition which can exhibit mutual magnetic coupling without being subjected to heat treatment.

EMBODIMENT 9

Figure 14:
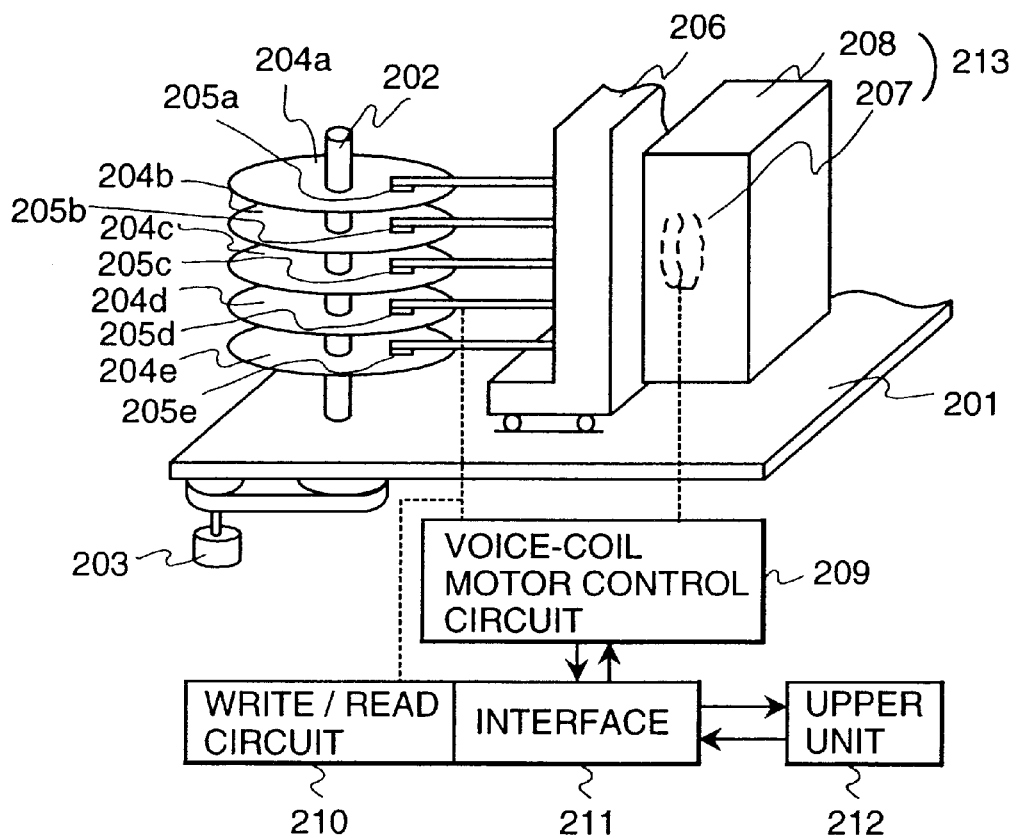
FIG. 14 is a diagram indicative of a magnetic disk apparatus utilizing an MR head according to one embodiment of the invention.

With reference to FIG. 14, a schematic arrangement of a magnetic disk apparatus using an MR head according to an embodiment of the invention is shown. In the drawing, the MR head of the invention is seen as applied to a magnetic recording and reproducing device in the magnetic disk apparatus, but it is not limited thereto, and it can be applied to any magnetic recording and reproducing device, such as magnetic tape apparatus and the like, within the scope of the invention.

This magnetic disk apparatus will be described in detail with reference to FIG. 14. This magnetic disk apparatus is comprised of spindle 202, a plurality of magnetic disks 204a, 204b, 204c, 204d and 204e, the disks being stacked at an even distance from each other along the shaft of spindle 202, and a motor which drives spindle 202. Further, the apparatus is provided with carriage 206 mounted movably, a plurality of magnetic heads 205a, 205b, 205c, 205d and 205e to be carried by carriage 206, voice coil motor 213 including magnet 208 and voice coil 207 for actuating carriage 206, and base 201 for supporting these components.

The same is also provided with voice coil motor control circuit 209, which in response to a signal from upper control equipment 212, controls voice coil motor 213, and write/read circuit 210, which has a function to convert data transmitted from upper control equipment 212 to a current to be supplied to a corresponding magnetic head in accordance with a writing method associated with magnetic disk 204a and the like, as well as to amplify data sent from magnetic disk 204a and the like, and to convert the amplified data to a digital signal, the write/read circuit 210 being connected to upper control unit 212 via interface 211.

A data read-out operation to read data from magnetic disk 204d in the magnetic disk apparatus will be described in the following. A command as to which data is to be read from the disk is given from upper controller 212 to voice coil motor control circuit 209 via interface 211. In response to a control current from voice coil motor control circuit 209, voice coil motor 213 actuates carriage 206 to move the group of magnetic heads 205a, 205b, 205c, 205d and 205e at a high speed and pinpoints head 205d precisely at a position over a track on the magnetic disk 204d where the data to be read is stored. This precise pinpointing is implemented by magnetic head 205d, which reads out servo information stored together with data in the magnetic disk 204d and supplies its positioning information to voice coil motor control circuit 209. Motor 203 mounted on base 201 rotates the plurality of magnetic disks 204a, 204b, 204c, 204d, 204d engaging spindle 202. In response to a signal from write/read circuit 210, a designated magnetic disk 204d is selected, and upon detection of a leading position of a designated area, magnetic head 205d reads out a data signal therefrom. This data is implemented by data exchange between magnetic head 205d connected to write/read circuit 210 and magnetic disk 204d. The data which is read out is converted to a predetermined signal, which is then transmitted to upper control unit 212.

Although the data read out operation is explained by way of example with reference to magnetic disk 204d, it is the same with any of the other magnetic disks. Further, the magnetic disk apparatus in FIG. 14 is depicted to have five magnetic disks, but the apparatus is not limited thereto, and any number of disks may be used within the scope of the invention.

The following advantages and results as summarized below have been accomplished according to the invention. Through the provision of the longitudinal bias layer which is provided in order to suppress Barkhausen noise in the magnetoresistive head utilizing the anisotropic magnetoresistive effect and giant magnetoresistive effect, and which has a underlayer made of a ferromagnetic thin film, amorphous ferromagnetic thin film or antiferromagnetic thin film, and a hard magnetic thin film formed on the underlayer, a decrease in coercive force can be advantageously suppressed even if a longitudinal bias layer is formed on the magnetic thin films, such as the magnetoresistive film, soft magnetic thin film for transverse biasing, and the like, having a face-centered cubic lattice crystal structure. In addition, due to the mutual magnetic coupling present between the magnetoresistive film or the soft magnetic thin film for transverse biasing and the hard magnetic thin film, the magnetization in these thin films is stabilized, thereby providing an excellent magnetoresistive head free from Barkhausen noise.

Further, through the provision of the longitudinal bias layer of the invention, electromagnetic conversion characteristics of the head can be stabilized thereby minimizing fluctuations of output waveform. Moreover, an improved magnetic disk apparatus having an improved reproducing output and high recording density can be provided.

We claim:

1. A magnetoresistive head having a magnetoresistive film which converts a magnetic signal to an electric signal utilizing a magnetoresistive effect, a pair of electrodes which supply a signal detection current to said magnetoresistive film, and a longitudinal bias layer which applies a longitudinal bias field to said magnetoresistive film;

said magnetoresistive film comprising:

a multi-layered film which includes a first magnetic thin film, an intermediate layer of a non-magnetic conductive thin film, a second magnetic thin film, and an antiferromagnetic layer wherein a direction of magnetization in said first magnetic thin film is fixed by an exchange interaction between said first magnetic thin film and said antiferromagnetic layer, and a direction of magnetization in said second magnetic thin film is substantially perpendicular to the direction of magnetization in said first magnetic thin film in the absence of an external magnetic field; and said longitudinal bias layer comprising:

an underlayer comprising an amorphous ferromagnetic thin film and a hard magnetic thin film which is formed on said underlayer.

2. The magnetoresistive head as claimed in claim 1, wherein said underlayer comprises an amorphous alloy including Co and $M_4$, where $M_4$ is at least one element selected from the group consisting of Ti, V, Zr, Nb, Mo, Hf, Ta, Y, Ru, Rh, Pd, Cu, Ag, Au and Pt.

3. The magnetoresistive head as claimed in claim 1, wherein said hard magnetic thin film comprises an alloy including as its main components Co and $M_1$, where $M_1$ is at least one element selected from the group of Cr, Ta, Ni, Pt and Re, or an allow with addition of oxides including Co, $M_1$ and $M_2$, where $M_2$ is at least one oxide selected from the group of silicon oxide, zirconium oxide, aluminum oxide and tantalum oxide.

4. The magnetoresistive head as claimed in claim 2, wherein said hard magnetic thin film comprises an alloy including as its main components Co and $M_1$, where $M_1$ is at least one element selected from the group of Cr, Ta, Ni, Pt and Re, or an allow with addition of oxides including Co, $M_1$ and $M_2$, where $M_2$ is at least one oxide selected from the group of silicon oxide, zirconium oxide, aluminum oxide and tantalum oxide.

5. A magnetic disk apparatus having a magnetic recording medium for recording information, a magnetic head for reading and writing said information, said magnetic head having a magnetoresistive element having a longitudinal bias layer provided by a hard magnetic thin film on an underlayer wherein said underlayer is an amorphous ferromagnetic thin film, an actuator for moving said magnetic head to a position designated on said magnetic recording medium, and a controller for controlling transmission and reception of said information during reading and writing using said magnetic head and for controlling movement of said actuator, said magnetoresistive element comprising a magnetoresistive film as a multi-layered film which includes a first magnetic thin film, an intermediate layer of a non-magnetic conductive thin film, a second magnetic thin film, and an antiferromagnetic layer, wherein a direction of magnetization in said first magnetic thin film is fixed by an exchange interaction between said first magnetic thin film and said antiferromagnetic layer, and a direction of magnetization in said second magnetic thin film is substantially perpendicular to the direction of magnetization in said first magnetic thin film in the absence of an external magnetic field, and wherein an electrical resistance of said magnetoresistive film changes according to a change of a relative angle between directions of magnetization in said first magnetic thin film and said second magnetic thin film, said magnetoresistive film exhibiting a giant magnetoresistive effect.

6. The magnetic disk apparatus as claimed in claim 5, wherein said underlayer comprises an amorphous ferromagnetic alloy including Co and $M_4$, where $M_4$ is at least one element selected from the group consisting of Ti, V, Zr, Nb, Mo, Hf, Ta, Y, Ru, Rh, Pd, Cu, Ag, Au and Pt.

7. The magnetic disk apparatus as claimed in claim 5, wherein said hard magnetic thin film comprises an alloy including as its main components Co and $M_1$, where $M_1$ is at least one element selected from the group of Cr, Ta, Ni, Pt and Re, or an alloy with addition of oxides including Co, $M_1$ and $M_2$, where $M_2$ is at least one oxide selected from the group of silicon oxide, zirconium oxide, aluminum oxide and tantalum oxide.

* * * * *